United States Patent
Arakawa et al.

(10) Patent No.: US 12,306,330 B2
(45) Date of Patent: May 20, 2025

(54) RADAR DEVICE AND VEHICLE EQUIPPED WITH SAME

(71) Applicant: Murata Manufacturing Co., Ltd., Kyoto (JP)

(72) Inventors: Nobuya Arakawa, Kyoto (JP); Katsuhisa Kashiwagi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 520 days.

(21) Appl. No.: 17/480,811

(22) Filed: Sep. 21, 2021

(65) Prior Publication Data

US 2022/0003833 A1 Jan. 6, 2022

Related U.S. Application Data

(63) Continuation of application No. PCT/JP2020/011307, filed on Mar. 13, 2020.

(30) Foreign Application Priority Data

Mar. 22, 2019 (JP) .................................. 2019-054993
Oct. 2, 2019 (JP) .................................. 2019-181880

(51) Int. Cl.
*G01S 7/03* (2006.01)
*G01S 7/02* (2006.01)
(Continued)

(52) U.S. Cl.
CPC .............. *G01S 7/038* (2013.01); *G01S 7/028* (2021.05); *G01S 7/40* (2013.01); *G01S 13/931* (2013.01)

(58) Field of Classification Search
CPC . G01S 7/038; G01S 7/028; G01S 7/40; G01S 12/931
(Continued)

(56) References Cited

U.S. PATENT DOCUMENTS 4,665,401 A * 5/1987 Garrard .................. G01S 13/68
    342/75
10,120,062 B1 * 11/2018 Dorfan ..................... H04B 1/00
(Continued)

FOREIGN PATENT DOCUMENTS

JP    H04-305180 A    10/1992
JP    2007093480 A * 4/2007 ............... G01S 7/40
(Continued)

OTHER PUBLICATIONS

Friederich et al, "Terahertz Radome Inspection," Photonics 2018, 5, 1; Licensee MDPI, Basel, Switzerland, doi:10.3390/photonics5010001 (Year: 2018).*

(Continued)

*Primary Examiner* — James R Hulka
*Assistant Examiner* — Samarina Makhdoom
(74) *Attorney, Agent, or Firm* — McDonald Hopkins LLC

(57) ABSTRACT

A detection component of a reflected wave generated due to a transmitted wave being reflected inside a radome is removed from a measurement intermediate frequency signal IFγ obtained by a mixer circuit when measuring the position of an object, the detection component of the reflected wave being removed by a radome reflection correcting unit subtracting a difference Diff. stored in advance in a correction data storage unit. In addition, when the radome reflection correcting unit performs the subtraction, the phase of the result of the subtraction is corrected by a phase shift amount $e^{j\Delta\theta}$ calculated by the phase shift amount calculating unit so that a phase shift of a measurement intermediate frequency signal IFγ caused by the device temperature is corrected. A distance/angle computing unit computes the position of the object from the thus-corrected measurement intermediate frequency signal IFγ.

19 Claims, 12 Drawing Sheets

(51) Int. Cl.
*G01S 7/40* (2006.01)
*G01S 13/931* (2020.01)

(58) Field of Classification Search
USPC ........................................................ 342/173
See application file for complete search history.

(56) References Cited

U.S. PATENT DOCUMENTS

| | | | |
|---|---|---|---|
| 2006/0046638 A1 | 3/2006 | Takeuchi et al. | |
| 2008/0224916 A1 | 9/2008 | Takagi | |
| 2010/0039346 A1* | 2/2010 | Peter ...................... | H01Q 1/421 |
| | | | 342/368 |
| 2013/0181857 A1* | 7/2013 | Noble ...................... | H01Q 3/26 |
| | | | 342/21 |
| 2015/0123872 A1* | 5/2015 | Fujita ........................ | G01S 7/03 |
| | | | 343/872 |
| 2015/0177303 A1* | 6/2015 | Ebling .................. | G01S 7/4026 |
| | | | 342/27 |
| 2016/0231417 A1* | 8/2016 | Aoki ........................ | G01S 7/032 |
| 2017/0222311 A1* | 8/2017 | Hess ...................... | G01S 13/931 |
| 2017/0276788 A1* | 9/2017 | Wodrich ................ | G01S 13/931 |
| 2017/0285140 A1* | 10/2017 | Gupta .................. | H03D 1/2245 |
| 2017/0299711 A1* | 10/2017 | Kishigami ........... | G01S 13/5242 |
| 2017/0356941 A1* | 12/2017 | Ahmed ................. | G01S 7/4004 |
| 2018/0306903 A1* | 10/2018 | Heuel ....................... | G01S 7/40 |
| 2018/0351243 A1* | 12/2018 | Lewis .................... | H01Q 1/282 |
| 2020/0049794 A1 | 2/2020 | Sakai et al. | |

FOREIGN PATENT DOCUMENTS

| | | |
|---|---|---|
| JP | 2008-224511 A | 9/2008 |
| JP | 2009-294071 A | 12/2009 |
| JP | 2018-179847 A | 11/2018 |
| WO | 2005/043779 A1 | 5/2005 |

OTHER PUBLICATIONS

International Search Report for International Patent Application No. PCT/JP2020/011307 dated Jun. 16, 2020.
Written Opinion for International Patent Application No. PCT/JP2020/011307 dated Jun. 16, 2020.

* cited by examiner

RADAR DEVICE AND VEHICLE EQUIPPED WITH SAME

CROSS REFERENCE TO RELATED APPLICATIONS

This is a continuation of International Application No. PCT/JP2020/011307 filed on Mar. 13, 2020 which claims priority from Japanese Patent Application No. 2019-054993 filed on Mar. 22, 2019, and claims priority from Japanese Patent Application No. 2019-181880 filed on Oct. 2, 2019. The contents of these applications are incorporated herein by reference in their entireties.

BACKGROUND

Technical Field

The present disclosure relates to a radar device including a radome that measures an object by receiving reflected waves generated by transmitted waves hitting the object and being reflected, and relates to a vehicle equipped with the radar device.

For example, in the related art, a radar device of this type is disclosed in Patent Document 1.

This radar device includes a casing, an element part, and a cover part. The element part includes an antenna substrate having an array antenna, which is formed on a surface of the antenna substrate, that transmits and receives radio waves. The antenna substrate is housed in the casing and the cover part is fixed to a front surface of the casing. The cover part is formed of a dielectric material that allows radio waves transmitted and received by the element part to pass therethrough and a center part of a transmissive part of the cover part is a planar part having a planar shape parallel to the antenna plane. The area of the planar part is set so as to overlap a range obtained by extending an antenna central area by an area corresponding to the Brewster's angle. The Brewster's angle is the angle of incidence at which the reflectance of horizontally polarized waves at the interface between materials having different refractive indices is zero.

The angle of incidence of radar waves radiated from the array antenna inside the cover of the planar part is less than or equal to the Brewster's angle. Therefore, reflectance of horizontally polarized waves of radar waves can be suppressed by the cover part of the radome. Therefore, degradation of the sensitivity of the radar device caused by reflection of horizontally polarized waves can be suppressed and the detection accuracy can be improved. Furthermore, detection of false images that do not actually exist caused by the reflection of radar waves inside the cover part can be prevented.

Patent Document 1: Japanese Unexamined Patent Application Publication No. 2018-179847

BRIEF SUMMARY

However, when part of the body of a vehicle, such as a door handle or a rocker panel, is used as a radome, as in the case of an in-vehicle radar, for example, the shape of the body of the vehicle cannot be freely changed, and therefore, it is not possible to suppress reflection of radar waves inside the radome by designing the shape of the radome as in the radar device of the related art disclosed in Patent Document 1. Therefore, in a radar device where the shape of the radome cannot be changed, it is difficult to improve the accuracy with which objects are detected and prevent the detection of false images by suppressing degradation of the sensitivity of the radar device, like in the radar device of the related art disclosed in Patent Document 1.

In order to solve the above-described problem, an embodiment of the present disclosure provides a radar device including: a transmission signal generator that generates a transmission signal; a transmission antenna that transmits the transmission signal generated by the transmission signal generator as a transmitted wave; a reception antenna that receives a reflected wave generated as a result of the transmitted wave hitting and being reflected by an object; a mixer circuit that mixes the transmission signal transmitted by the transmission antenna and a reception signal received by the reception antenna and converts the signals into an intermediate frequency signal; a radome that protects the device; a correction data storage unit that stores in advance a difference between a when-attached intermediate frequency signal obtained by the mixer circuit when the radome is attached to the device and a when-not-attached intermediate frequency signal obtained by the mixer circuit when the radome is not attached to the device; a phase shift amount calculating unit that calculates a phase shift amount of the intermediate frequency signal obtained by the mixer circuit caused by a device temperature; and a radome reflection correcting unit that subtracts the difference stored in advance in the correction data storage unit from a measurement intermediate frequency signal obtained by the mixer circuit when measuring the object, and when performing the subtraction, corrects a phase of a result of the subtraction by the phase shift amount calculated by the phase shift amount calculating unit.

According to this configuration, a detection component of a reflected wave generated due to a transmitted wave being reflected inside the radome is removed from the measurement intermediate frequency signal obtained by the mixer circuit when the position of an object is measured, the detection component of the reflected wave being removed by the radome reflection correcting unit subtracting a difference stored in advance in the correction data storage unit from the measurement intermediate frequency signal. In addition, when the radome reflection correcting unit performs the subtraction, the phase of the result of the subtraction is corrected by a phase shift amount calculated by the phase shift amount calculating unit so that a phase shift of the measurement intermediate frequency signal caused by the device temperature is corrected. Therefore, the effect of a reflection component of a radar wave inside the radome can be accurately removed, the accuracy with which an object is detected can be improved, and detection of a false image can be prevented without necessarily changing the shape of the radome.

Furthermore, an embodiment of the present disclosure provides a vehicle that includes the above-described radar device.

According to the embodiments of the present disclosure, there can be provided a radar device that can improve detection accuracy of an object and can prevent detection of a false image without necessarily changing the shape of a radome, and there can be provided a vehicle including the radar device.

DETAILED DESCRIPTION

Next, modes for implementing a radar device of the present disclosure will be described.

Figure 1:
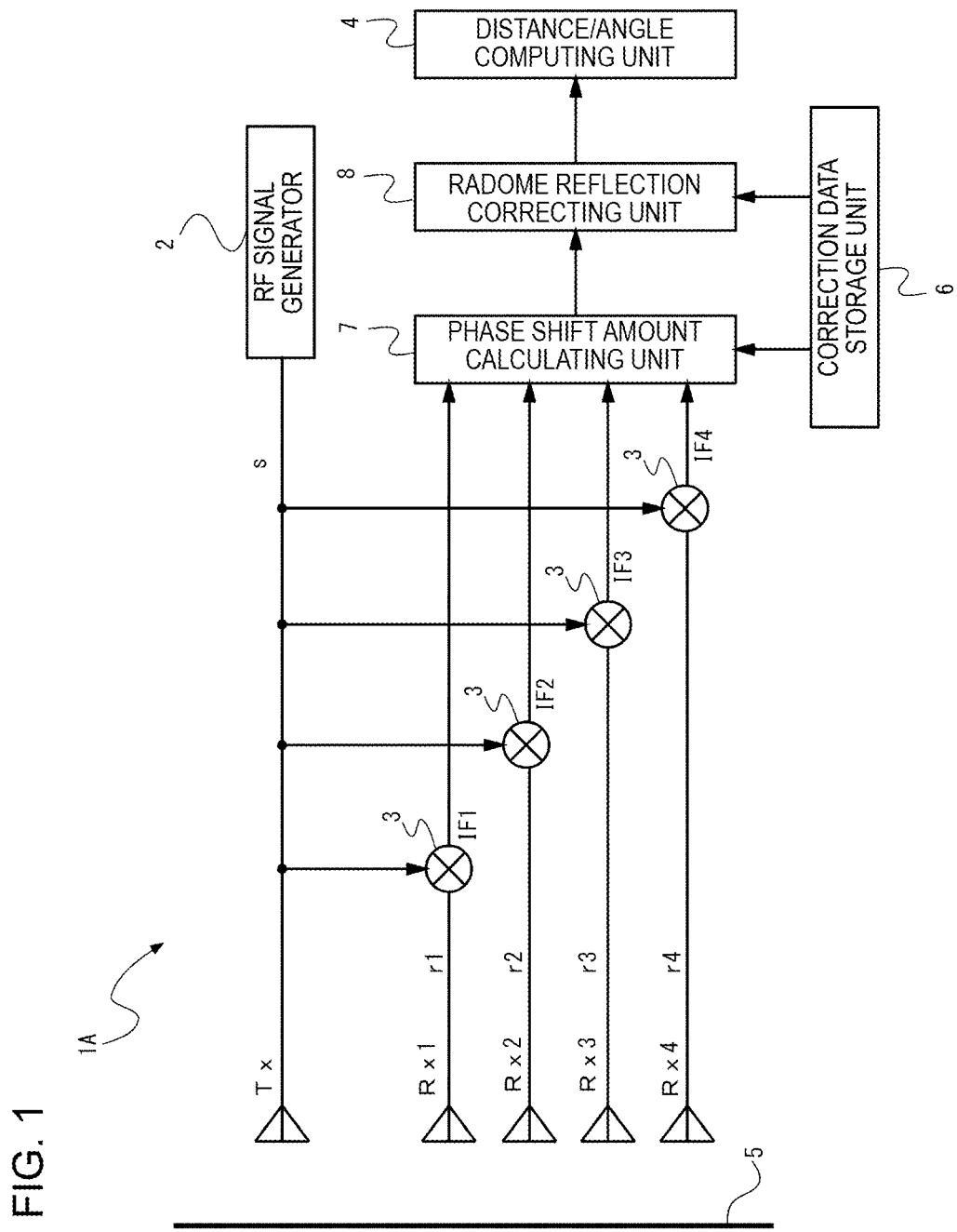
FIG. 1 is a block diagram illustrating an outline configuration of a radar device according to a First Embodiment of the present disclosure.

FIG. 1 is a block diagram illustrating an outline configuration of a radar device 1A according to a First Embodiment of the present disclosure.

The radar device 1A includes a radio-frequency (RF) signal generator 2, a transmission antenna Tx, reception antennas Rx1, Rx2, Rx3, and Rx4 (hereafter, collectively referred to as Rx), mixer circuits 3, a distance/angle computing unit 4, and a radome 5 that covers and protects the radar device 1A. Note that although a case is described in this embodiment in which there is one transmission antenna Tx and four reception antennas Rx, the numbers of transmission and reception antennas Tx and Rx are not limited to these examples. For example, a plurality of each type of antenna may be provided, such as four transmission antennas Tx and twelve reception antennas Rx.

The RF signal generator 2 is a transmission signal generator that generates a transmission signal s and is formed of a voltage controlled oscillator and so forth. The transmission antenna Tx converts the transmission signal s generated by the RF signal generator 2 into transmitted waves such as millimeter waves and transmits the transmitted waves to an object, which is not illustrated. The transmission signal s is transmitted inside a circuit and transmitted waves propagate through space. The reception antennas Rx1, Rx2, Rx3, and Rx4 receive reflected waves generated by the transmitted waves hitting and being reflected by an object. The mixer circuits 3 respectively mix the transmission signal s transmitted by the transmission antenna Tx and reception signals r1, r2, r3, and r4 (hereafter, collectively referred to as r) received by the reception antennas Rx1, Rx2, Rx3, and Rx4 together and convert the signals into intermediate frequency signals IF1, IF2, IF3, and IF4 (hereafter, collectively referred to as IF). Specifically, the mixer circuits 3 multiply a transmission signal wave voltage Vtx of the transmission signal s and reception signal wave voltages Vrx of the reception signals r1, r2, r3, and r4 together so as to convert the reception signals r1, r2, r3, and r4 received by the reception antennas Rx1, Rx2, Rx3, and Rx4 into the intermediate frequency signals IF1, IF2, IF3, and IF4.

The distance/angle computing unit 4 forms a computing circuit that computes the position of the object from the intermediate frequency signals IF1, IF2, IF3, and IF4 generated through the conversions performed by the mixer circuits 3. In this embodiment, the distance/angle computing unit 4 calculates a distance R to the object from frequencies f of the intermediate frequency signals IF1, IF2, IF3, and IF4 and calculates an azimuth angle θ of the object from phase differences between the intermediate frequency signals IF1, IF2, IF3, and IF4. In this embodiment, a case will be described in which the distance R to the object and the azimuth angle θ of the object are calculated as a two-dimensional position of the object. However, an elevation angle φ of the object may be also be determined in order to calculate a three-dimensional position of the object by arranging the transmission antennas Tx in a two-dimensional array.

In this embodiment, the radar device 1A includes a correction data storage unit 6 (e.g., a memory or like storage), a phase shift amount calculating unit 7 (e.g., a processor or like controller), and a radome reflection correcting unit 8 (e.g., a processor or like controller) between the mixer circuits 3 and the distance/angle computing unit 4 (e.g., a processor or like controller). The correction data storage unit 6 stores in advance differences Diff. between when-attached intermediate frequency signals IF1, IF2, IF3, and IF4 obtained by the mixer circuits 3 when the radome 5 is attached to the radar device 1A (hereafter, referred to as IFα) and when-not-attached intermediate frequency signals IF1, IF2, IF3, and IF4 obtained by the mixer circuits 3 when the radome 5 is not attached to the radar device 1A (hereafter, referred to as IFβ). In other words, transmitted waves are transmitted from the transmission antenna Tx in the same environment with and without necessarily the radome 5 attached, reception signals of transmitted wave components that leak from the transmission system to the reception system and the transmission signal s output from the RF signal generator 2 are mixed together in the mixer circuits 3, the when-attached intermediate frequency signals IFα and the when-not-attached intermediate frequency signals IFβ are measured in advance, and the differences Diff. between these signals are stored as correction data in the correction data storage unit 6.

Figures 2A, 2B:
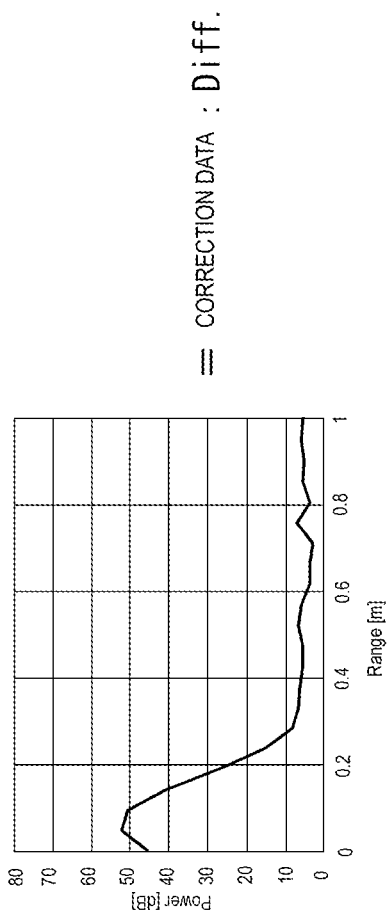
FIGS. 2A and 2B include diagrams for conceptually explaining the method of obtaining correction data in the radar device according to the First Embodiment.

FIGS. 2A and 2B are diagrams for conceptually explaining a method of obtaining the correction data. In this figure, Graph A illustrates a when-attached intermediate frequency signal IFα measured for any one of the reception antennas Rx1, Rx2, Rx3, and Rx4, and Graph B illustrates a when-not-attached intermediate frequency signal IFβ measured for any one of the reception antennas Rx1, Rx2, Rx3, and Rx4. The horizontal axis of each graph represents a distance R [m] corresponding to the frequency f of the intermediate frequency signal IF and the vertical axis represents a signal strength Power [dB] of the intermediate frequency signal IF. The intermediate frequency signal IF is expressed as a complex number, and although only the signal strength is illustrated in each graph, the phase of the signal is also measured at the same time.

Since the transmitted wave components leak from the transmission system to the reception system inside the radar device 1A, the signal strength of the intermediate frequency signal IF is higher at short distances in the Graphs A and B. Furthermore, the signal strength at short distances is around 20 [dB] higher in the when-attached intermediate frequency signal IFα in Graph A than in the when-not-attached intermediate frequency signal IFβ in Graph B. This is because a component generated by the transmitted waves transmitted from the transmission antenna Tx hitting and being reflected by the radome 5 is received by the reception antenna Rx. This reflection component is the cause of a false image appearing when measuring the position of the object using the radar device 1A. In this embodiment, this reflection component, which is the cause of a false image, is obtained by calculating the difference Diff. by subtracting the when-not-attached intermediate frequency signal IFβ from the when-attached intermediate frequency signal IFα, and the calculated difference Diff. is stored in the correction data storage unit 6 as correction data. In addition, in this embodiment, the data of the when-attached intermediate frequency signal IFα illustrated in Graph A is stored in advance in the correction data storage unit 6 together with the difference Diff. The data of the difference Diff. and the when-attached intermediate frequency signal IFα are measured for each of the reception antennas Rx1, Rx2, Rx3, and Rx4 and stored in advance in the correction data storage unit 6 for each of the reception antennas Rx1, Rx2, Rx3, and Rx4.

There may be a difference in the temperature of the radar device 1A between when the differences Diff. were stored in advance in the correction data storage unit 6 and when the position of the object is actually measured by the radar device 1A. If a difference occurs in the temperature of the radar device 1A, the phases of the intermediate frequency signals IF obtained by the mixer circuits 3 will be shifted. The phase shift amount calculating unit 7 calculates the phase shift amounts, which are caused by the device temperature, of the intermediate frequency signals IF obtained by the mixer circuits 3. In this embodiment, the phase shift amount calculating unit 7 calculates a phase shift amount from the phase difference, at a prescribed frequency, between two signals consisting of a measurement intermediate frequency signal obtained by the mixer circuit 3 when measuring the position of the object (hereafter referred to as IFγ) and a when-attached intermediate frequency signal IFα stored in advance in the correction data storage unit 6.

Figure 3A:
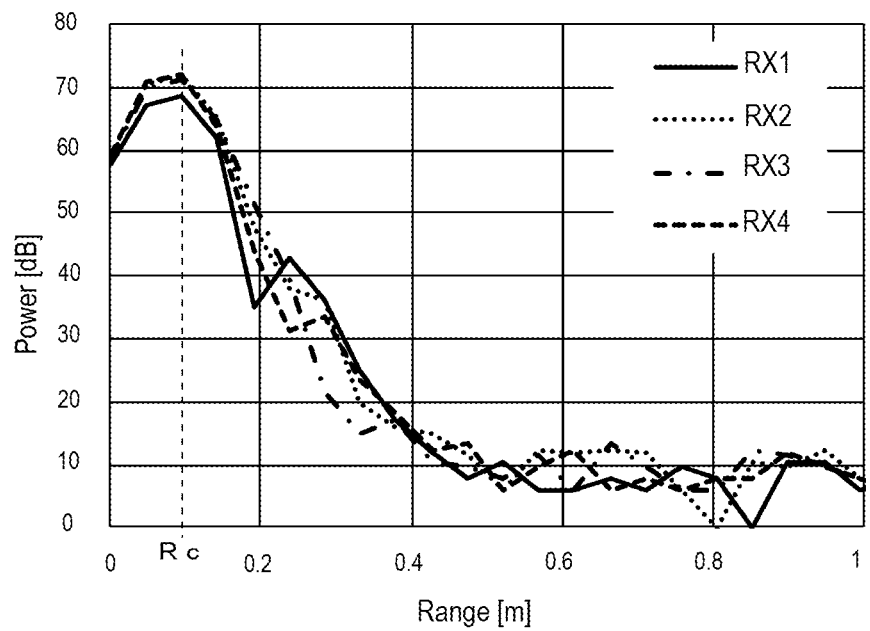
FIGS. 3A and 3B include diagrams for conceptually explaining the method of obtaining a phase shift amount in the radar device according to the First Embodiment.
Figure 3B:
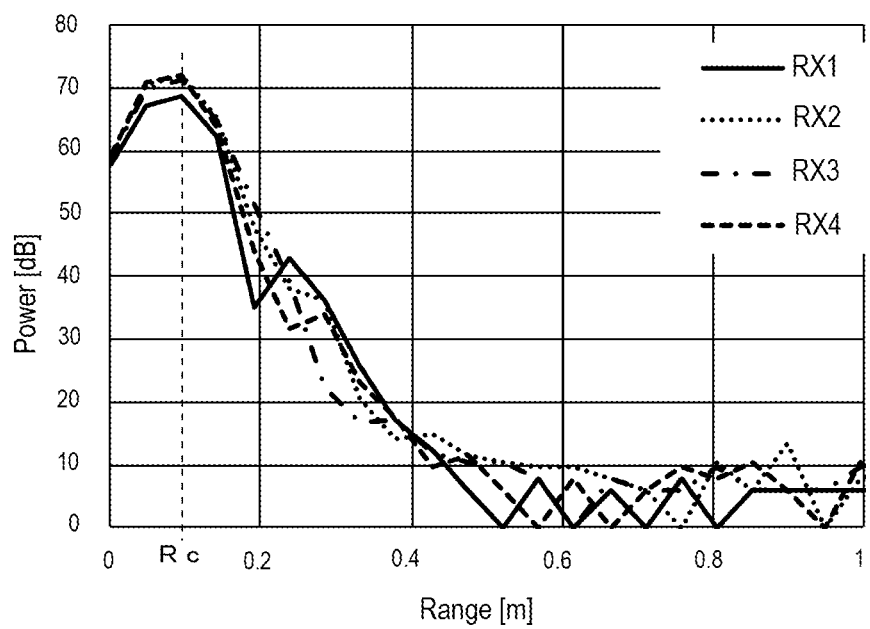

FIGS. 3A and 3B are diagrams for conceptually explaining a method of obtained this phase shift amount in which a fast Fourier transform (FFT) is applied to an intermediate frequency signal IF. In this figure, Graph C illustrates measurement intermediate frequency signals IFγ measured for the reception antennas Rx1, Rx2, Rx3, and Rx4 and Graph D illustrates when-attached intermediate frequency signals IFα measured and stored in advance for the reception antennas Rx1, Rx2, Rx3, and Rx4. The horizontal and vertical axes of these graphs are the same as those illustrated in FIGS. 2A and 2B. Furthermore, the measurement line illustrated as a solid line represents the measurement result obtained for the reception antenna Rx1, the measurement line illustrated as a short dash line represents the measurement result obtained for the reception antenna Rx2, the measurement line illustrated as a dot dash line represents the measurement result obtained for the reception antenna Rx3, and the measurement line illustrated as a long dash line represents the measurement result obtained for the reception antenna Rx4. In this case as well, the intermediate frequency signals IF are expressed as complex numbers, and although only the signal strengths are illustrated in each graph, the phases of the signals are also measured at the same time.

In this embodiment, a prescribed frequency used to calculate the phase shift amount between the measurement intermediate frequency signals IFγ in Graph C and the when-attached intermediate frequency signals IFα in Graph D is set to the frequency f of a band that is different from that of the frequency f corresponding to the distance R to the object. Here, the frequency is set to a frequency f corresponding to a short distance where there is no object, in other words, a frequency f where a transmitted wave component leaking from the transmission system to the reception system is detected. This frequency f corresponds to a bin at a distance Rc indicated by the dotted line in each of the Graphs C and D illustrated in FIGS. 3A and 3B, and this bin is described as a reference bin below. The frequency spectrum of an intermediate frequency signal IF after undergoing FFT has the form of equally spaced strips of a certain width, and the term "bin" used here refers to these strips. The phase shift amount calculating unit 7 calculates the difference between the phase of a measurement intermediate frequency signal IFγ and the phase of a when-attached intermediate frequency signal IFα in the reference bin as a phase shift amount $e^{j\Delta\theta}$. Here, $e^{j\Delta\theta}$ is an exponential function having e as the base.

In this embodiment, the phase shift amount calculating unit 7 calculates the difference between the phase of an average value of the measurement intermediate frequency signals IFγ and the phase of the average values of the when-attached intermediate frequency signals IFα in the reference bin as the phase shift amount $e^{j\Delta\theta}$. However, the difference between the phase of a measurement intermediate frequency signal IFγ and the phase of a when-attached intermediate frequency signal IFα in the reference bin may be individually calculated for each of the reception antennas Rx1, Rx2, Rx3, and Rx4 in order to individually obtain phase shift amounts $e^{j\Delta\theta}$ for the reception antennas Rx1, Rx2, Rx3, and Rx4.

The radome reflection correcting unit 8 is input with the differences Diff. from the correction data storage unit 6 and is input with the phase shift amount $e^{j\Delta\theta}$ from the phase shift amount calculating unit 7. Then, the differences Diff., which are stored in advance in the correction data storage unit 6, are subtracted from the measurement intermediate frequency signals IFγ, and when performing this subtraction, the phases of the results of the subtraction are corrected by the phase shift amount $e^{j\Delta\theta}$ calculated by the phase shift amount calculating unit 7.

Figure 4:
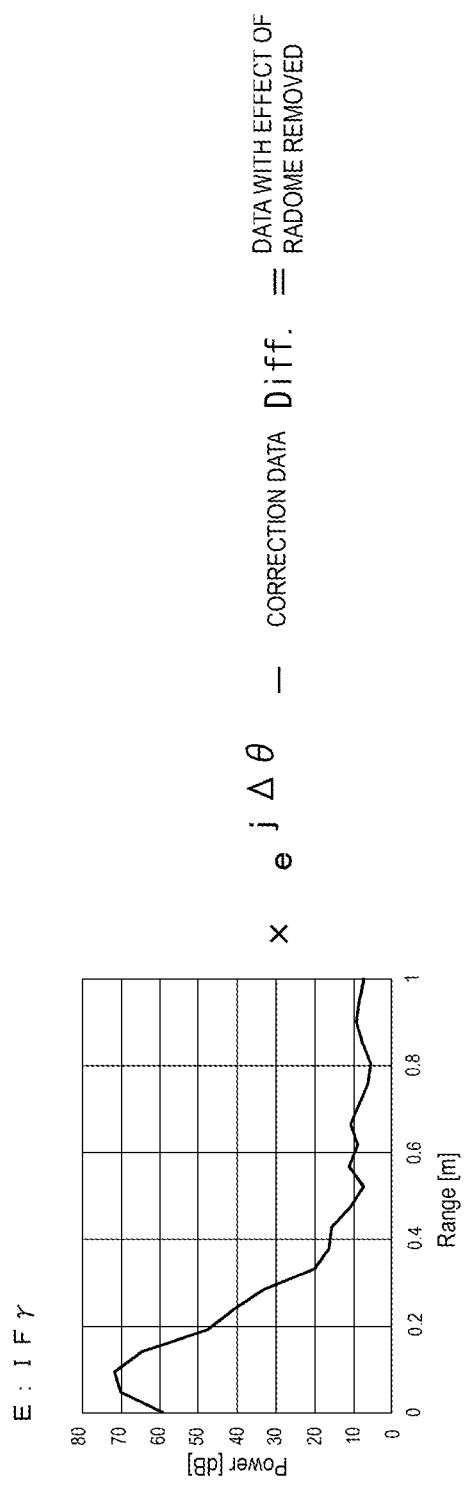
FIG. 4 is a diagram for conceptually explaining a method of correcting a measurement intermediate frequency signal in the radar device according to the First Embodiment.

FIG. 4 is a diagram for conceptually explaining the correction method used by the radome reflection correcting unit 8. In this figure, Graph E illustrates a measurement intermediate frequency signal IFγ measured for any one of the reception antennas Rx1, Rx2, Rx3, and Rx4 and the horizontal axis and the vertical axis of the graph are the same as those illustrated in FIGS. 2A and 2B. In this embodiment, the radome reflection correcting unit 8 first corrects the phase of the measurement intermediate frequency signal IFγ by multiplying the measurement intermediate frequency signal IFγ by the phase shift amount $e^{j\Delta\theta}$. Then, the difference Diff. input from the correction data storage unit 6 is subtracted from the result of the multiplication. The result of this subtraction is a corrected measurement intermediate frequency signal IFγ from which the effect of the reflection component of the transmitted wave inside the radome 5 has been removed. This computation performed by the radome reflection correcting unit 8 is performed for each of the reception antennas Rx1, Rx2, Rx3, and Rx4, and the differences Diff. stored in advance in the correction data storage unit 6 for the reception antennas Rx1, Rx2, Rx3, and Rx4 are subtracted from the phase-corrected values of the measurement intermediate frequency signals IFγ obtained for the reception antennas Rx1, Rx2, Rx3, and Rx4.

In this embodiment, first, the phases of the measurement intermediate frequency signals IFγ are corrected and then the differences Diff. are subtracted. However, it is also possible to correct the phases of the differences Diff. by multiplying the differences Diff. by inverted-sign phase shift amounts $e^{-j\Delta\theta}$ and then subtracting these phase-corrected differences Diff. from the measurement intermediate frequency signals IFγ.

Figure 5:
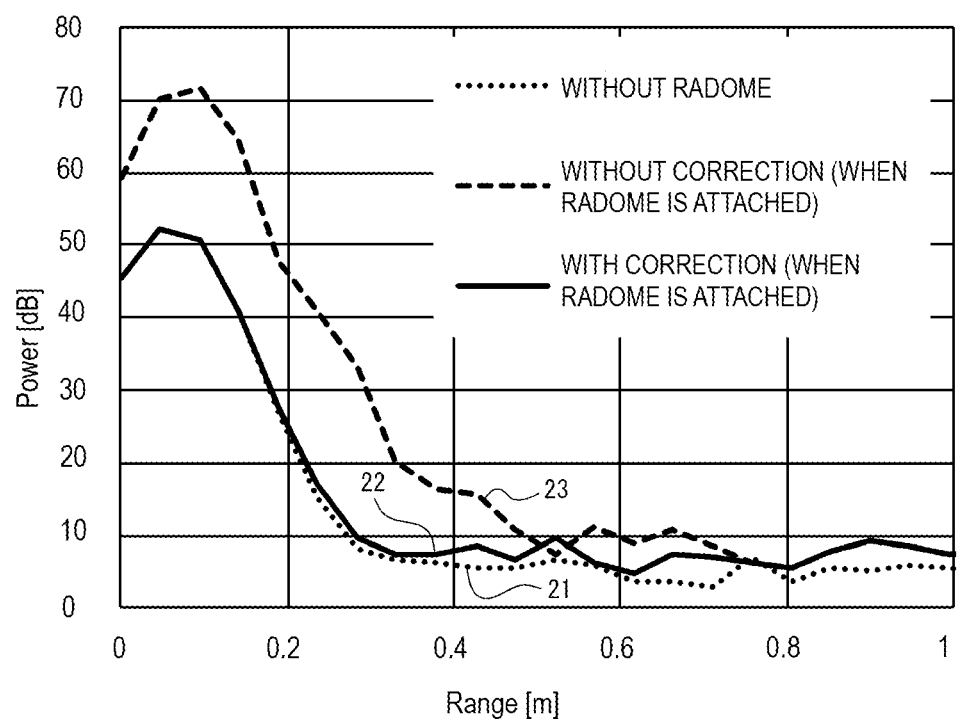
FIG. 5 is a graph illustrating a measurement intermediate frequency signal corrected by a radome reflection correcting unit of the radar device according to the First Embodiment and a measurement intermediate frequency signal that has not been corrected for comparison with an intermediate frequency signal for when the radome is not attached.

FIG. 5 is a graph in which a measurement intermediate frequency signal IFγ that has been corrected in this way and a measurement intermediate frequency signal IFγ that has not been corrected in this way are illustrated for comparison with an intermediate frequency signal IFβ obtained when the radome 5 is not attached. The horizontal and vertical axes of the graph are the same as those illustrated in FIGS. 2A and 2B. In addition, a measurement line 21 illustrated as a short dash line represents an ideal when-not-attached intermediate frequency signal IFβ obtained when the radome 5 is not attached to the radar device 1A and in which there is absolutely no effect from components reflected by the radome 5. A measurement line 22 illustrated as a solid line represents a measurement intermediate frequency signal IFγ obtained by performing the above-described correction when the radome 5 is attached. A measurement line 23 illustrated as a long dash line represents a measurement intermediate frequency signal IFγ obtained without necessarily performing the above-described correction when the radome 5 is attached.

From the graph, it is clear that the measurement intermediate frequency signal IFγ obtained with correction and illustrated by the measurement line 22 enables almost the same measurement result to be obtained as the when-not-attached intermediate frequency signal IFβ at short distances compared with the measurement intermediate frequency signal IFγ obtained without necessarily correction and illustrated by the measurement line 23. From this, it is confirmed that a reflected component of a transmitted wave inside the radome 5 is greatly reduced by correcting the phase of the measurement intermediate frequency signal IFγ by the phase shift amount $e^{j\Delta\theta}$ and subtracting the difference Diff. from the phase-corrected measurement intermediate frequency signal IFγ.

The distance/angle computing unit 4 is input, from the radome reflection correcting unit 8, with the measurement intermediate frequency signals IFγ from which the effect of the radome 5 has been removed and computes the position of the object, i.e, in this embodiment, the distance R to the object and the azimuth angle θ of the object, from the input measurement intermediate frequency signals IFγ.

According to the radar device 1A of this embodiment, the differences Diff. stored in advance in the correction data storage unit 6 are subtracted from the measurement intermediate frequency signals IFγ, which are obtained by the mixer circuits 3 when performing position measurement of the object, by the radome reflection correcting unit 8 as illustrated in FIG. 4, and as a result, detection components of reflected waves generated due to transmitted waves being reflected inside the radome 5 are removed. In addition, when the radome reflection correcting unit 8 performs the subtraction, the phases of the results of the subtraction are corrected by a phase shift amount $e^{j\Delta\theta}$ calculated by the phase shift amount calculating unit 7 so that phase shifts of the measurement intermediate frequency signals IFγ caused by the device temperature are corrected. The distance/angle computing unit 4 computes the position of the object from the thus-corrected measurement intermediate frequency signals IFγ.

Therefore, according to the radar device 1A of this embodiment, the correction for removing the effect of the radome 5 is applied directly to the measurement data obtained by the mixer circuits 3 itself without necessarily correcting the object position computation data, and therefore the correction for removing the effect of the radome 5 can be performed with high accuracy. Therefore, the effect of a reflection component of a radar wave inside the radome 5 can be accurately removed without necessarily changing the shape of the radome 5, and the detection accuracy of the position of the object computed by the distance/angle computing unit 4 can be improved and detection of a false image can be prevented.

Furthermore, according to the radar device 1A of this embodiment, the phase shift amount $e^{j\Delta\theta}$, which is caused by the device temperature, of the intermediate frequency signals IF obtained by the mixer circuits 3 is easily calculated by the phase shift amount calculating unit 7 from the phase differences, in the reference bins of both signals, between the measurement intermediate frequency signals IFγ and the when-attached intermediate frequency signals IFα, as illustrated in FIGS. 3A and 3B.

In addition, according to the radar device 1A of this embodiment, since the frequency f in the reference bin where the phase shift amount $e^{j\Delta\theta}$ is calculated and the frequency f corresponding to the distance R to the object are in different bands, the computation performed by the distance/angle computing unit 4 in order to calculate the position of the object can be performed without necessarily being affected by the calculation of the phase shift amount $e^{j\Delta\theta}$ performed by the phase shift amount calculating unit 7. Therefore, the accuracy of the computations performed by the distance/angle computing unit 4 in order to calculate the position of the object is ensured.

Figure 6:
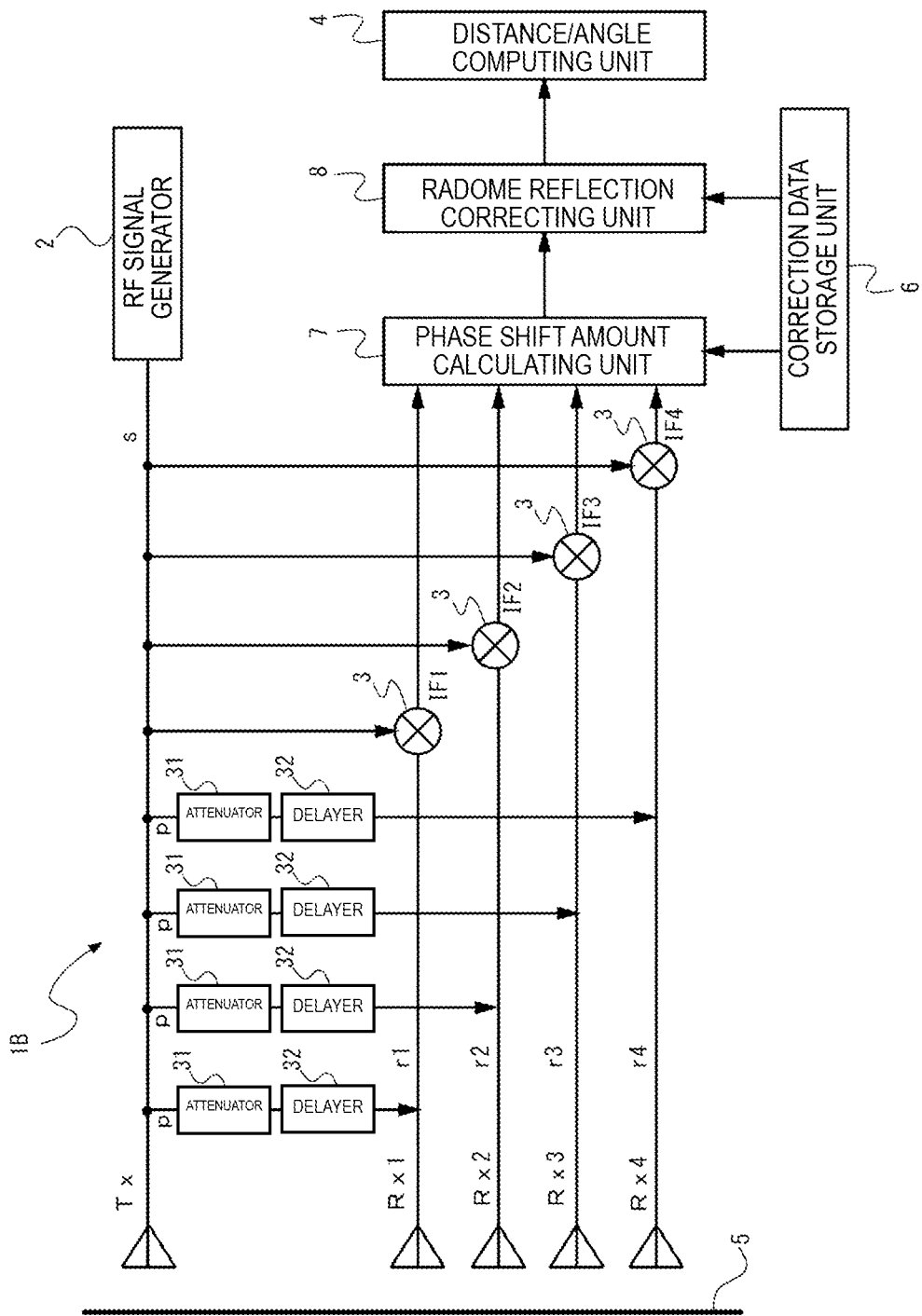
FIG. 6 is a block diagram illustrating an outline configuration of a radar device according to a Second Embodiment of the present disclosure.

Next, a radar device according to a Second Embodiment of the present disclosure will be described. FIG. 6 is a block diagram illustrating an outline configuration of a radar device 1B according to the Second Embodiment. In this figure, parts that are the same as or correspond to those in FIG. 1 are denoted by the same symbols and description thereof is omitted.

The radar device 1B according to the Second Embodiment differs from the radar device 1A according to the above-described First Embodiment in that the radar device 1B includes signal paths p that distribute part of the transmission signal s generated by the RF signal generator 2 to each of the reception signal lines of the reception antennas Rx1, Rx2, Rx3, and Rx4 and includes attenuators 31 and delayers 32 provided on the signal paths p. The rest of the configuration is the same as that of the radar device 1A according to the First Embodiment described above. The attenuators 31 attenuate the transmission signal s distributed to the signal paths p and reduce the signal strength of the transmission signal s when the signal strength is too large. The delayers 32 delay the transmission signal s distributed to the signal paths p by a predetermined amount of time.

According to the radar device 1B of the Second Embodiment, part of the transmission signal s is distributed to each of the reception signal lines of the reception antennas Rx1, Rx2, Rx3, and Rx4. The signal strength is reduced by the attenuators 31, the signals are delayed by predetermined amount of time by the delayers 32, and the signals are then input to the mixer circuits 3. Therefore, in each mixer circuit 3, the transmission signal s transmitted by the transmission antenna Tx and part of the transmission signal s that has been attenuated, delayed, and distributed to the reception signal line of the reception antenna Rx are mixed, and an intermediate frequency signal IFη for calculating a phase shift amount is generated.

The phase shift amount $e^{j\Delta\theta}$, which is caused by the device temperature, of the intermediate frequency signal IF obtained by the mixer circuit 3 is calculated by the phase shift amount calculating unit 7 from the phase difference, in the reference bins of the two signals, between the intermediate frequency signal IFη for calculating the phase shift amount and the when-attached intermediate frequency signal IFα stored in advance in the correction data storage unit 6.

Therefore, according to the radar device 1B of the Second Embodiment, the operational effect that correction can be performed with which the effect of the radome 5 is removed with high accuracy for the intermediate frequency signals IF obtained by the mixer circuits 3 is achieved similarly to the operational effect achieved by the radar device 1A according to the First Embodiment, and additionally, the phase shift amount $e^{j\Delta\theta}$ of the intermediate frequency signals IF caused by the device temperature is calculated with certainty from the intermediate frequency signals IFη for calculating the phase shift amount and the when-attached intermediate frequency signals IFα without necessarily being affected by the signal states of the measurement intermediate frequency signals IFγ obtained by the mixer circuits 3 when measuring the position of an object. Therefore, even if the measurement intermediate frequency signals IFγ are obtained when the signal level of the transmission wave component that leaks from the transmission system to the reception system is very low or when the leaking transmission wave component cannot be detected, the phase shift amount $e^{j\Delta\theta}$, which are caused by the device temperature, of the intermediate frequency signals IF is calculated with certainty. Therefore, the phases of the measurement intermediate frequency signals IFγ are always appropriately corrected by the phase shift amount $e^{j\Delta\theta}$ and the position of the object is always accurately computed by the distance/angle computing unit 4.

In the above-described embodiment, the delayers 32 may have a function of adjusting the delay time of the transmission signal s distributed to the signal paths p. According to this configuration, the delay time of the transmission signal s distributed to the signal paths p can be set to any desired amount of time using the delay time adjusting function of the delayers 32. Therefore, the input time of the transmission signal s to the mixer circuits 3, which is treated as a pseudo-signal of the reception signal r and is distributed to the signal paths p, can be set to any desired time.

Therefore, the frequency f of the reference bin used to calculate the phase shift amount $e^{j\Delta\theta}$ between two signals consisting of the intermediate frequency signal IFη for calculating the phase shift amount and the when-attached intermediate frequency signal IFα can be set to any desired frequency fc. Therefore, the frequency f of the reference bin used to calculate the phase shift amount $e^{j\Delta\theta}$ can be set to a frequency fc that is convenient for calculating the phase shift amount $e^{j\Delta\theta}$. For example, in the case where the distance to the object is 5 [m], the phase shift amount $e^{j\Delta\theta}$ can also be calculated by setting the reference bin to a distance of 6 [m].

Figure 7:
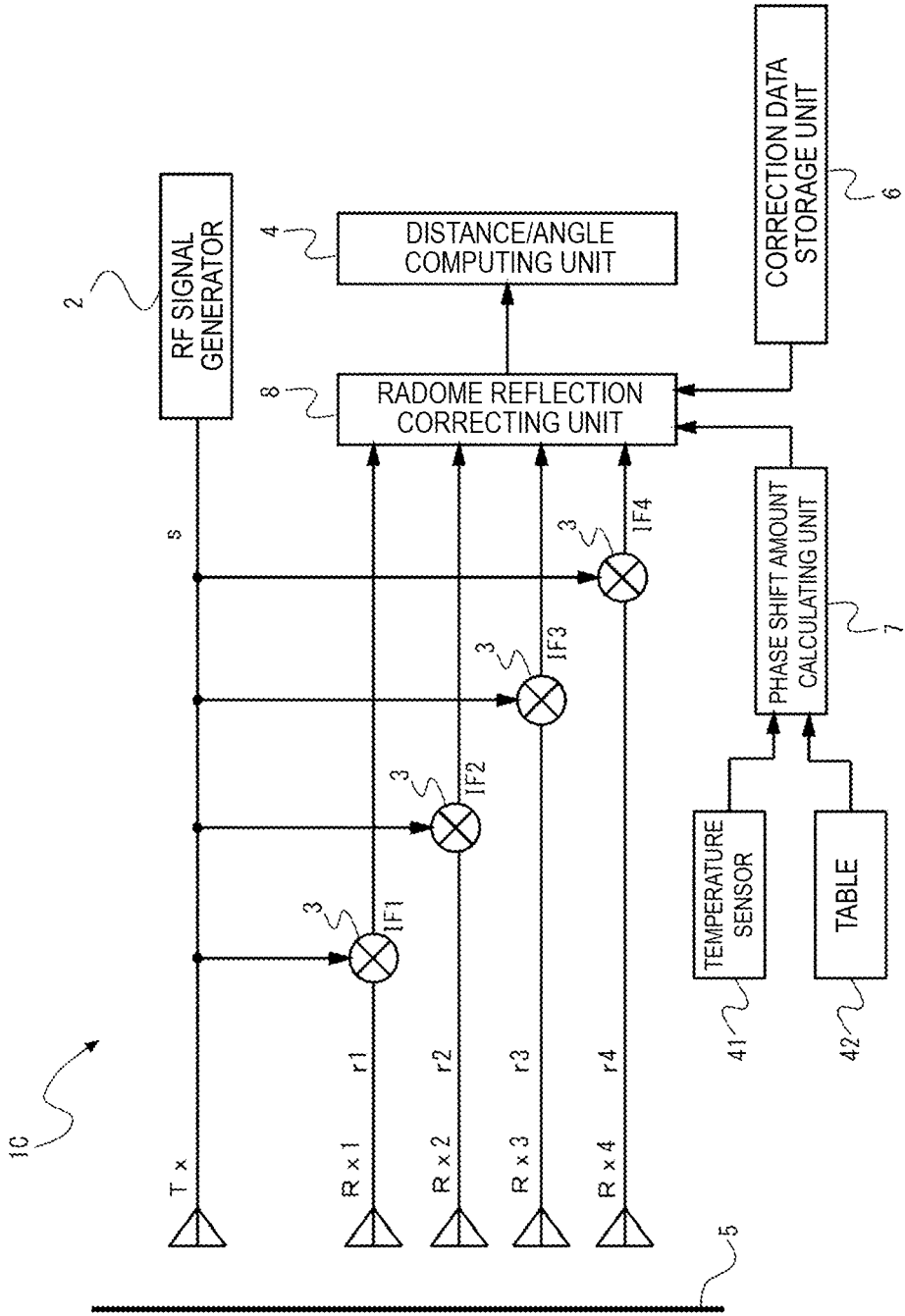
FIG. 7 is a block diagram illustrating an outline configuration of a radar device according to a Third Embodiment of the present disclosure.

Next, a radar device according to a Third Embodiment of the present disclosure will be described. FIG. 7 is a block diagram illustrating an outline configuration of a radar device 1C according to the Third Embodiment. In this figure, parts that are the same as or correspond to those in FIG. 1 are denoted by the same symbols and description thereof is omitted.

The radar device 1C according to the Third Embodiment differs from the radar device 1A according to the above-described First Embodiment in that the radar device 1C includes a temperature sensor 41 and a table 42 (e.g., stored in a memory) that represents the relationship between the device temperature and phase change, and in that the outputs of the mixer circuits 3 are directly supplied to the radome reflection correcting unit 8 without necessarily passing through the phase shift amount calculating unit 7 and the phase shift amount calculating unit 7 calculates the phase shift amount $e^{j\Delta\theta}$ from the outputs of the temperature sensor 41 and the table 42. The rest of the configuration is the same as that of the radar device 1A according to the First Embodiment described above. The temperature sensor 41 measures the temperature of the radar device 1C. Phase shift amounts $e^{j\Delta\theta}$ at various temperatures of the radar device 1C are stored in advance as a list in the table 42. The phase shift amount calculating unit 7 outputs the phase shift amounts $e^{j\Delta74}$, which are stored in association with the device temperatures measured by the temperature sensor 41 in the table 42, to the radome reflection correcting unit 8 as phase shift amounts $e^{j\Delta\theta}$ of the intermediate frequency signals IF caused by the device temperature.

According to the radar device 1C of the Third Embodiment, the phase shift amount $e^{j\Delta\theta}$, which is caused by the device temperature, of the intermediate frequency signals IF obtained by the mixer circuits 3 is easily calculated by the phase shift amount calculating unit 7 from the phase shift amounts $e^{j\Delta\theta}$ stored in the table 42 in association with the device temperatures measured by the temperature sensor 41. The measurement intermediate frequency signals IFγ are corrected by the calculated phase shift amount $e^{j\Delta\theta}$ and the same operational effect as that realized by the radar device 1A according to the First Embodiment is achieved.

A case in which the table 42, in which phase shift amounts $e^{j\Delta\theta}$ for various temperatures of the radar device 1C are stored, is provided inside the radar device 1C has been described in the above embodiment. However, phase shift amounts $e^{j\Delta\theta}$ may be stored for various temperatures of the radar device 1C in a personal computer or microcomputer external to the radar device 1C.

Figure 8:
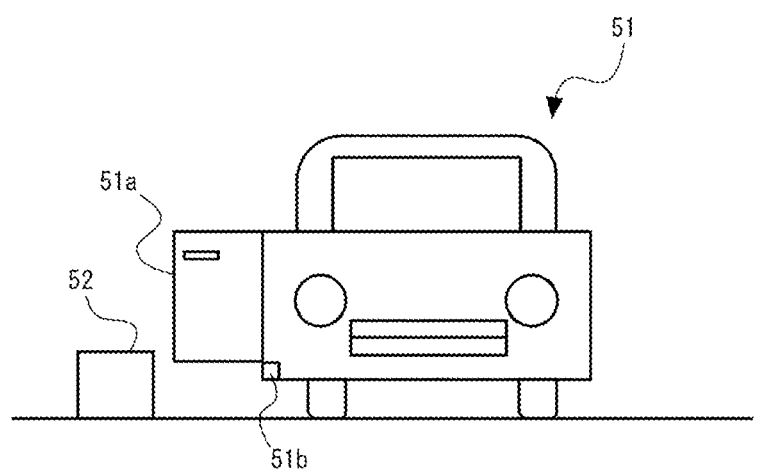
FIG. 8 is an outline configuration diagram of a vehicle according to an embodiment of the present disclosure.

The radar devices 1A, 1B, and 1C are suitable for use as an in-vehicle radar that detects objects at comparatively short distances, for example. FIG. 8 is an outline configuration diagram of a vehicle 51 according to an embodiment of the present disclosure. The radar device 1A, 1B, or 1C is provided inside a rocker panel 51*b*, which forms the vehicle body below a door 51*a* at the side of the vehicle, with the rocker panel 51*b* serving as the radome 5. When the radar device 1A, 1B, or 1C is provided in the vehicle 51 in this way, obstacles in the surroundings of the vehicle when opening or closing the door 51*a*, such as a curb 52, are detected by the radar device 1A, 1B, or 1C, and the door 51*a* can be prevented from being damaged due to the door 51*a* hitting an obstacle such as the curb 52.

Figure 9:
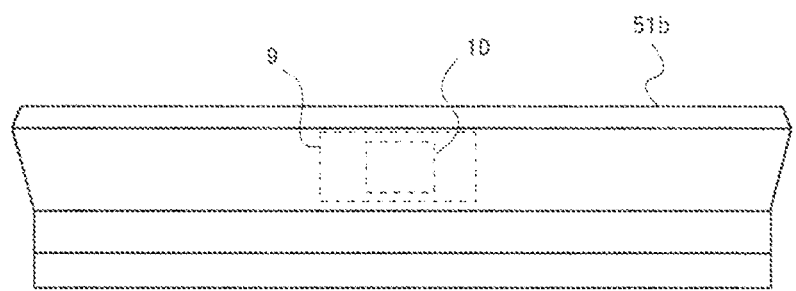
FIG. 9 is a front view of a rocker panel to which a radar device according to a Fourth Embodiment of the present disclosure is attached.

Next, a radar device according to a Fourth Embodiment of the present disclosure will be described. FIG. 9 is a front view of the rocker panel 51*b* as seen from the side of the vehicle 51 when a radar device 1D according to this Fourth Embodiment is mounted inside the rocker panel 51*b*. Furthermore, FIG. 10A is a sectional view of the radar device 1D when the rocker panel 51*b* illustrated in FIG. 9 is mounted on the vehicle 51.

Figure 10A:
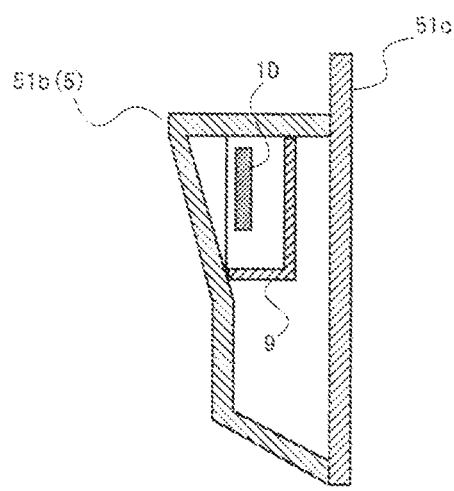
FIG. 10A is a sectional view of the radar device according to the Fourth Embodiment and FIG. 10B is a perspective view of a case illustrated in FIG. 10A.

When the rocker panel 51*b* is mounted on the vehicle 51, the rear surface of the rocker panel 51*b* is covered by a metal plate 51*c* of a body part of the vehicle 51, as illustrated in FIG. 10A. The rocker panel 51*b* is formed of a material that allows radio waves to pass therethrough, such as resin, and the radar device 1D having the rocker panel 51*b* as the radome 5 is formed so as to be covered by the case 9 inside the radome 5. The internal configuration of the radar device 1D is the same as that of the radar device 1A, 1B, or 1C of any one of the above embodiments.

Figure 10B:
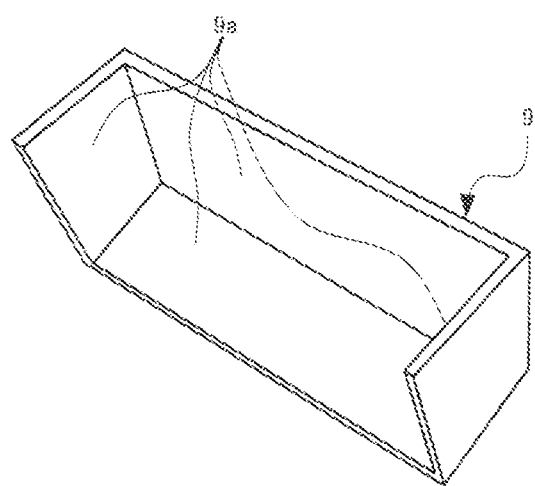

As illustrated in the external perspective view of FIG. 10B, the case 9 has a rectangular parallelepiped shape having four sides without necessarily a top plate and a front plate and is formed of a material that reflects radio waves such as metal, such as copper, aluminum, iron, or the like or a resin containing metal particles. The top plate of the case 9 facing upward from the vehicle 51 is composed of the top panel of the rocker panel 51*b*, as illustrated in FIG. 10A. In addition, a front plate of the case 9, which would face outward from the side of the vehicle 51, would be located in the outgoing direction of transmitted waves transmitted from the transmission antenna Tx and the incoming direction of the reflected waves received by the reception antennas Rx, and is omitted from the case 9 because the front plate would interfere with outgoing radio waves from the case 9 and incoming radio waves to the case 9. The case 9 covers the device periphery of the radar device 1D in this manner except for in the outgoing direction of the transmitted waves transmitted from the transmission antenna Tx and the incoming direction of the reflected waves received by the reception antennas Rx. The size of the case 9 and the distance between the case 9 and the radar device 1D may be set as desired.

Figure 11A:
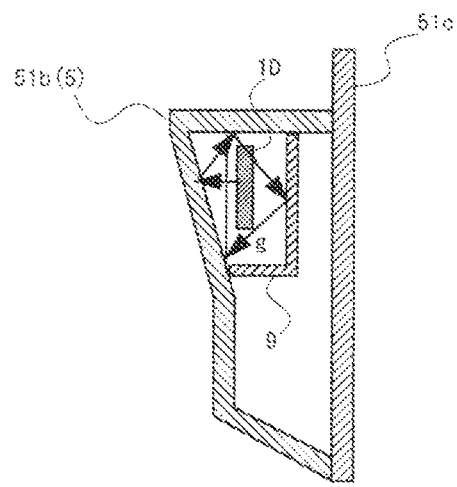
FIG. 11A is a sectional view illustrating the reflection state of a transmitted wave reflected by an inner surface of a radome of the radar device according to the Fourth Embodiment and FIG. 11B is a sectional view illustrating the reflection state of a transmitted wave reflected by an inner surface of a radome of a radar device not covered by a case.
Figure 11B:
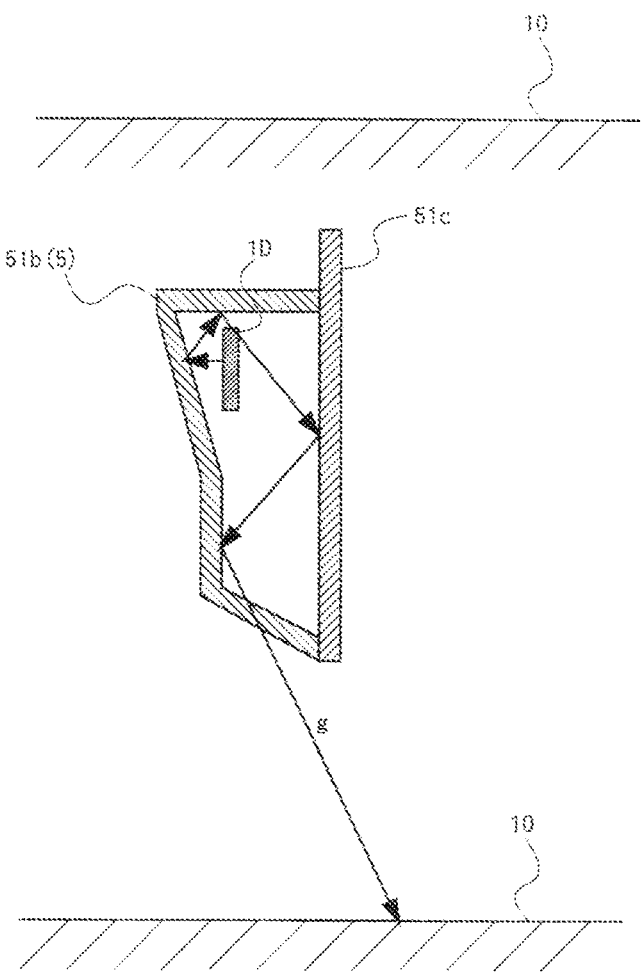

FIG. 11A illustrates the reflection state of some radio waves g that have hit and been reflected by the inner surface of the radome 5 among the transmitted waves emitted from the transmission antenna Tx inside the radar device 1D according to the Fourth Embodiment equipped with the case 9. FIG. 11B illustrates the reflection state of some radio waves g that have hit and been reflected by the inner surface of the radome 5 among the transmitted waves emitted from the transmission antenna Tx inside the radar device 1D not equipped with the case 9. In FIGS. 11A and 11B, parts that are the same as or correspond to those in FIGS. 10A and 10B are denoted by the same symbols and description thereof is omitted.

In the radar device 1D according to the Fourth Embodiment illustrated in FIG. 11A, out of the transmitted waves emitted from the transmission antenna Tx, some radio waves g that have hit and been reflected by the inner surface of the radome 5 are confined inside the case 9. However, in the radar device 1D not equipped with the case 9 illustrated in FIG. 11B, out of the transmitted waves emitted from the transmission antenna Tx, some radio waves g that have hit and been reflected by the inner surface of the radome 5 pass through the radome 5 and exit to outside the radome 5, and hit a road surface 10 as illustrated in the figure. Some of the radio waves g that have hit the road surface 10 follow the same optical path back to the radar device 1D and are received by the reception antennas Rx inside the radar device 1D.

As described above, detection components of reflected waves generated due to transmitted waves emitted from the transmission antenna Tx when measuring the position of an object being reflected inside the radome 5 are eliminated by differences Diff. stored in advance in the correction data storage unit 6 being subtracted from the measurement intermediate frequency signals IFγ by the radome reflection correcting unit 8. The differences Diff. are calculated in advance by subtracting the when-not-attached intermediate frequency signals IFβ when the radome 5 is not attached from the intermediate frequency signals IFα when the radome 5 is attached and storing the results in the correction data storage unit 6 as correction data. However, the environment of the radar device 1D at the time when the correction data was calculated will be different from that at the time when the position of the object is actually measured, and for example, in an environment in which some of the radio waves g reflected from the road surface 10 are received by the reception antennas Rx as illustrated in FIG. 11B, the assumed value of the when-attached intermediate frequency signal IFα will change due to the effect of these radio waves g received by the reception antennas Rx and the value of the difference Diff. will be different from the value assumed and stored in the correction data storage unit 6 in advance.

On the other hand, in the radar device 1D according to the Fourth Embodiment, as illustrated in FIG. 11A, the periphery of the radar device 1D is covered by the case 9 and some radio waves g, out of the transmitted waves emitted from the transmission antenna Tx, that hit and are reflected by the inner surface of the radome 5 are confined inside the case 9. Therefore, the environment of the radar device 1D at the time when the position of the object is actually measured is not in a state where the reception antennas Rx are affected by the radio waves g reflected from the road surface 10 as illustrated in FIG. 11B, and rather is kept the same as the environment of the radar device 1D at the time when correction data was calculated. Therefore, detection components of reflected waves generated due to transmitted waves being reflected inside the radome 5 when measuring the position of the object are accurately eliminated by subtracting the differences Diff. stored in advance in the correction data storage unit 6 from the measurement intermediate frequency signals IFγ using the radome reflection correcting unit 8. Therefore, according to the radar device 1D according to the Fourth Embodiment, measurement of the position of the object is accurately performed.

Figure 12:
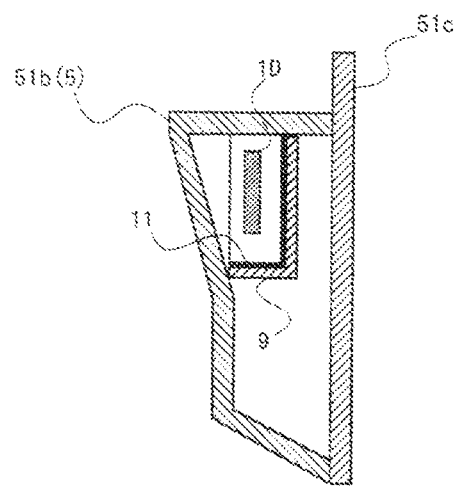
FIG. 12 is a sectional view of a radar device according to a first Modification of the Fourth Embodiment in which the inner surface of the case is provided with a radio wave absorber.

The radar device 1D according to the Fourth Embodiment may be configured to include a radio wave absorber 11 that absorbs radio waves on an inner surface 9*a* of the case 9 (refer to FIG. 10B), as in the cross-sectional view illustrated in FIG. 12. The radio wave absorber 11 is formed in the shape of a sheet, a pyramid, animal hair and so on, and any shape and material may be used as long as radio waves are absorbed. In FIG. 12, parts that are the same as or correspond to those in FIGS. 10A and 10B are denoted by the same symbols and description thereof is omitted.

The radio waves g confined inside the case 9, as illustrated in FIG. 11A, can be attenuated in strength by provided the radio wave absorber 11 on the inner surface 9a of the case 9. When the strength of the radio waves g confined inside the case 9 is high, the difference Diff. between the when-attached intermediate frequency signal IFα and the when-not-attached intermediate frequency signal IFβ becomes large, and when there is an error in the phase shift amount Δθ estimated from the reference bin, a component that cannot be removed by the subtraction illustrated in FIG. 4 becomes large, and the corrected data also contains a large error. However, when the radio waves g confined inside the case 9 are attenuated in strength by the radio wave absorber 11, the difference Diff. becomes smaller, and even if the phase shift amount Δθ contains an error, the effect on the corrected data is small.

Furthermore, if the strength of the radio waves g confined inside the case 9 is high, a signal input to electronic components constituting the reception system of the radar device 1D will become large and saturated, but if the radio waves g are attenuated in strength by the radio wave absorber 11, such a saturation problem will not occur. Therefore, by providing the radio wave absorber 11 on the inner surface 9a of the case 9, errors contained in the values of the corrected data are reduced, the when-attached intermediate frequency signals IFα are accurately measured in the reception system of the radar device 1D, and the accuracy with which the position of the object is measured by subtracting the differences Diff. from the measurement intermediate frequency signals IFγ is improved.

Figures 13A, 13B:
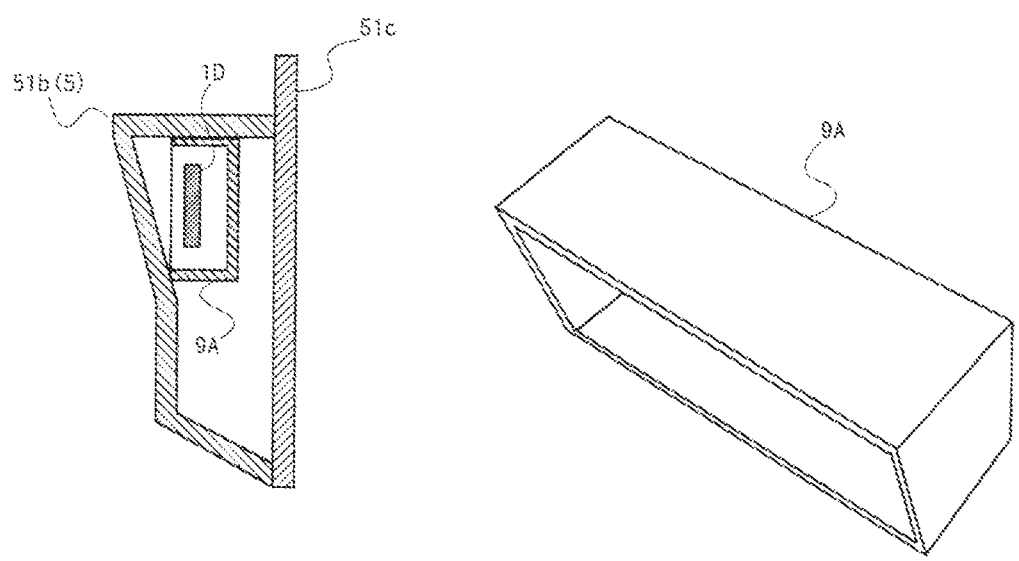
FIG. 13A is a sectional view of a radar device according to a second modification of the Fourth Embodiment in which the periphery of the device is covered by a rectangular parallelepiped shaped case having side surfaces on five sides thereof and FIG. 13B is a perspective view of the case illustrated in FIG. 13A.

In the radar device 1D according to the Fourth Embodiment described above, even if radio waves g escape from the case 9 to above the rocker panel 51b, i.e., to above the vehicle 51, there is no reflective object such as the road surface 10 above the vehicle 51, and therefore the case 9 is structured to have no top plate. However, as illustrated in the sectional view of the radar device 1D illustrated in FIG. 13A and the perspective view of a case 9A illustrated in FIG. 13B, it is desirable that the case 9A have a top plate so that the case 9A has side surfaces on five sides thereof. In FIG. 13, parts that are the same as or correspond to those in FIGS. 10A and 10B are denoted by the same symbols and description thereof is omitted. According to the case 9A, even if there is a reflective object above the case 9A, the corrected data can be calculated without necessarily there being an effect from the radio waves g reflected from the reflective object, and the position of the object can be accurately measured.

Figure 14A:
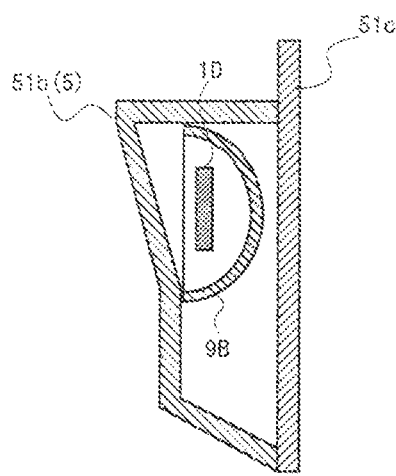
FIG. 14A is a sectional view of a radar device according to a third modification of the Fourth Embodiment in which the periphery of the device is covered by a dome shaped case and FIG. 14B is a perspective view of the case illustrated in FIG. 13A.
Figure 14B:
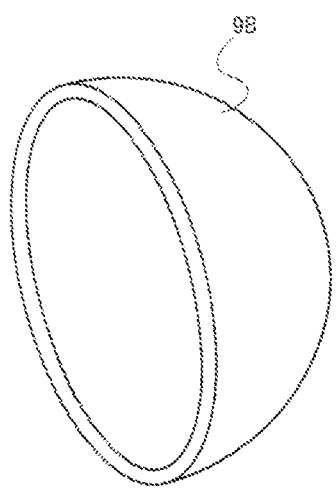

In addition, in the radar device 1D according to the Fourth Embodiment described above, it was described that the case 9 has a rectangular parallelepiped shape, but the case 9 may instead have a dome-like shape rather than a rectangular parallelepiped shape as illustrated in the sectional view of the radar device 1D illustrated in FIG. 14A and the perspective view of a case 9B illustrated in FIG. 14B. In FIGS. 14A and 14B, parts that are the same as or correspond to those in FIGS. 10A and 10B are denoted by the same symbols and description thereof is omitted. Similarly to the cases 9 and 9A, the case 9B covers the device periphery of the radar device 1D except for in the outgoing direction of the transmitted waves transmitted from the transmission antenna Tx and the incoming direction of the reflected waves received by the reception antennas Rx. The same operational effect as achieved by the above embodiments is also achieved with the case 9B.

In addition, the radio wave absorber 11 may be provided on the inner surfaces of the cases 9A and 9B illustrated in FIGS. 13 and 14. The same operational effect as achieved by the radar device 1D illustrated in FIG. 12 is also achieved with these configurations.

INDUSTRIAL APPLICABILITY

In the above-described embodiments, it has been described that the radar devices 1A, 1B, 1C, and 1D each include the distance/angle computing unit 4 as a computing circuit and measure the position of an object. However, a radar device according to an embodiment of the present disclosure does not necessarily have to measure the position of an object, and may instead, for example, measure the movement (motion) of an object by using reflected waves returning after transmitted waves hit the object. Such a radar device would also be able to perform correction on the intermediate frequency signals IF obtained by the mixer circuits 3 to remove the effect of the radome with high accuracy, and would achieve the same effect as the above embodiments.

REFERENCE SIGNS LIST 1A, 1B, 1C, 1D . . . radar device
2 . . . RF signal generator
3 . . . mixer circuit
4 . . . distance/angle computing unit (computing circuit)
5 . . . radome
6 . . . correction data storage unit
7 . . . phase shift amount calculating unit
8 . . . radome reflection correcting unit
9, 9A, 9B . . . case
10 . . . road surface
11 . . . radio wave absorber
31 . . . attenuator
32 . . . delayer
41 . . . temperature sensor
42 . . . table
51 . . . vehicle
51b . . . rocker panel (radome)
Tx . . . transmission antenna
Rx1, Rx2, Rx3, Rx4 . . . reception antenna
p . . . signal path

The invention claimed is:

1. A radar device comprising:
a transmission signal generator configured to generate a transmission signal;
a transmission antenna configured to transmit the transmission signal generated by the transmission signal generator as a transmitted wave;
a reception antenna configured to receive a reflected wave generated as a result of the transmitted wave hitting and being reflected by an object;
a mixer circuit configured to mix the transmission signal transmitted by the transmission antenna and a reception signal received by the reception antenna, and to convert the transmission and reception signals into an intermediate frequency signal;
a radome configured to protect the device;
a correction data storage configured to store in advance a difference between a when-attached intermediate frequency signal and a when-not-attached intermediate frequency, the when-attached intermediate frequency signal being obtained by the mixer circuit when the radome is attached to the device and the when-not-attached intermediate frequency signal being obtained by the mixer circuit when the radome is not attached to the device; and at least one controller configured to:
  determine a phase shift amount of the intermediate frequency signal obtained by the mixer circuit caused by a device temperature,
  subtract the difference stored in advance in the correction data storage from the intermediate frequency signal obtained by the mixer circuit when measuring the object, and
  when performing the subtraction, correct a phase of a result of the subtraction by the determined phase shift amount, wherein the when-attached intermediate frequency signal is obtained by mixing the transmission signal with the received signal that includes a transmission wave component of a transmission wave that is transmitted and leaked from the transmission antenna to the reception antenna, in the mixer circuit when the radome is attached to the device, and wherein the determined phase shift amount corresponds to the difference between a phase of the intermediate frequency signal obtained by the mixer circuit when measuring the object and a phase of the when-attached intermediate frequency signal.

2. The radar device according to claim 1, wherein the correction data storage further stores in advance, together with the difference, data of the when-attached intermediate frequency signal.

3. The radar device according to claim 1, further comprising:
  a signal path that distributes part of the transmission signal generated by the transmission signal generator to a reception signal line of the reception antenna;
  an attenuator on the signal path that is configured to attenuate the part of the transmission signal distributed to the signal path; and
  a delayer on the signal path that is configured to delay the part of the transmission signal distributed to the signal path.

4. The radar device according to claim 3, wherein the delayer is configured to adjust a delay time of the part of the transmission signal distributed to the signal path.

5. The radar device according to claim 2, wherein the prescribed frequency is a frequency of a band that is different from a frequency corresponding to a distance to the object.

6. The radar device according to claim 1, further comprising:
  a temperature sensor configured to measure a temperature of the device; and
  a table stored in advance in a memory, the table associating phase shift amounts with a plurality of temperatures of the device,
  wherein the controller is configured to determine the phase shift amount based on the table and a device temperature measured by the temperature sensor.

7. The radar device according to claim 1, wherein the at least one controller is further configured to determine a position of the object based on a corrected intermediate frequency signal.

8. The radar device according to claim 1, further comprising:
  a case that covers, inside the radome, a device periphery except for in an outgoing direction of the transmitted wave transmitted from the transmission antenna and an incoming direction of the reflected wave received by the reception antenna,
  wherein the case is of a material that reflects radio waves.

9. The radar device according to claim 8, further comprising:
  a radio wave absorber that is on an inner surface of the case and that is configured to absorb radio waves.

10. A vehicle comprising:
  the radar device according to claim 1.

11. The vehicle according to claim 10,
  wherein the radar device is inside a rocker panel that forms a portion of a vehicle body below a door on a side of the vehicle, and
  wherein the rocker panel is the radome.

12. The radar device according to claim 3, wherein the prescribed frequency is a frequency of a band that is different from a frequency corresponding to a distance to the object.

13. The radar device according to claim 4, wherein the prescribed frequency is a frequency of a band that is different from a frequency corresponding to a distance to the object.

14. The radar device according to claim 2, wherein the at least one controller is further configured to determine a position of the object based on a corrected intermediate frequency signal.

15. The radar device according to claim 3, wherein the at least one controller is further configured to determine a position of the object based on a corrected intermediate frequency signal.

16. The radar device according to claim 4, wherein the at least one controller is further configured to determine a position of the object based on a corrected intermediate frequency signal.

17. The radar device according to claim 5, wherein the at least one controller is further configured to determine a position of the object based on a corrected intermediate frequency signal.

18. The radar device according to claim 6, wherein the at least one controller is further configured to determine a position of the object based on a corrected intermediate frequency signal.

19. The radar device according to claim 1, wherein the at least one controller is further configured to:
  obtain a corrected intermediate frequency signal, from which an effect of the radome has been removed, and
  compute a position and an azimuth angle of the object from the corrected intermediate frequency signal.

* * * * *

UNITED STATES PATENT AND TRADEMARK OFFICE
CERTIFICATE OF CORRECTION

Page 1 of 1

PATENT NO. : 12,306,330 B2
APPLICATION NO. : 17/480811
DATED : May 20, 2025
INVENTOR(S) : Nobuya Arakawa et al.

It is certified that error appears in the above-identified patent and that said Letters Patent is hereby corrected as shown below:

In the Specification

Column 10, Line 42, "phase shift amounts $e^{j\Delta 74}$," should be --phase shift amounts $e^{j\Delta\theta}$,--

Signed and Sealed this
Fifteenth Day of July, 2025

Coke Morgan Stewart
*Acting Director of the United States Patent and Trademark Office*